(12) United States Patent
Hong

(10) Patent No.: US 12,405,989 B2
(45) Date of Patent: Sep. 2, 2025

(54) METHOD AND APPARATUS FOR CALCULATING TEXT SEMANTIC SIMILARITY, DEVICE AND STORAGE MEDIUM

(71) Applicant: Beijing Hydrophis Network Technology Co., Ltd., Beijing (CN)

(72) Inventor: Feng Hong, Beijing (CN)

(73) Assignee: Beijing Hydrophis Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/599,490

(22) Filed: Mar. 8, 2024

(65) Prior Publication Data

US 2024/0411795 A1   Dec. 12, 2024

(30) Foreign Application Priority Data

Jun. 9, 2023   (CN) .......................... 202310686371.9

(51) Int. Cl.
  *G06F 16/00*   (2019.01)
  *G06F 16/338*   (2019.01)
  *G06F 16/36*   (2019.01)
(52) U.S. Cl.
  CPC ............ *G06F 16/36* (2019.01); *G06F 16/338* (2019.01)
(58) Field of Classification Search
  CPC ................................ G06F 16/36; G06F 16/338
  USPC ................................................. 707/600–899
  See application file for complete search history.

(56) References Cited

U.S. PATENT DOCUMENTS

| | | | |
|---|---|---|---|
| 11,164,153 B1 * | 11/2021 | Hinton ................... | G06F 40/247 |
| 2021/0342652 A1 * | 11/2021 | Glassman .............. | G06F 18/251 |
| 2023/0059494 A1 * | 2/2023 | Hunter ................... | G06F 40/279 |
| 2023/0122684 A1 * | 4/2023 | Larson .................. | G06V 10/774 |
| | | | 382/159 |
| 2023/0274098 A1 * | 8/2023 | Syeda-Mahmood .... | G06N 5/02 |
| | | | 704/9 |
| 2024/0062044 A1 * | 2/2024 | Subramanian .......... | G06F 40/58 |
| 2024/0320249 A1 * | 9/2024 | Fusco ..................... | G06F 40/30 |

* cited by examiner

*Primary Examiner* — Michelle N Owyang

(57) ABSTRACT

The present disclosure relates to the technical field of text analysis, and discloses a method for calculating text semantic similarity, including: acquiring a text pair to be compared, and respectively extracting a text structural feature of each text in the text pair to be compared; performing feature scaling and feature standardization processing on each text structural feature to obtain an optimized text structural feature of each text; acquiring a text plane feature of each text in the text pair to be compared, and combining the optimized text structural feature of each text with a corresponding text plane feature to obtain a structure-plane feature of each text; and learning the structure-plane feature of each text to obtain a text similarity of the text pair to be compared, scoring the text similarity to obtain a text similarity score. The present disclosure can improve the accuracy of text similarity calculation.

17 Claims, 5 Drawing Sheets

METHOD AND APPARATUS FOR CALCULATING TEXT SEMANTIC SIMILARITY, DEVICE AND STORAGE MEDIUM

CROSS REFERENCE TO RELATED APPLICATIONS

The present application claims the benefit of Chinese Patent Application No. 202310686371.9 filed on Jun. 9, 2023, the contents of which are incorporated herein by reference in their entirety.

TECHNICAL FIELD

The present disclosure relates to the technical field of text analysis, and more particularly to a method and apparatus for calculating text semantic similarity, an electronic device and a computer-readable storage medium.

BACKGROUND

With the rapid development of Internet technology, text similarity calculation has been widely used in many fields, such as search, question and answer system. In a scene of actual use, there is a high demand for a matching accuracy of text similarity. In the prior art, similarity between texts is generally calculated according to similarity between vectors by converting the texts into vectors.

However, there is a serious drawback in calculating the similarity between the texts solely based on text vectors. For example, the two texts "I like eating vegetables" and "I don't like eating vegetables" are different from each other only by one Chinese character. However, the vector representations of the two texts may be very similar because they have a large quantity of identical characters. However, from the semantic point of view, the meanings of the two texts are indeed completely different. Most of the existing methods for calculating text semantic similarity use a plane similarity feature to represent the similarity of a pair of texts, wherein the characterization is relatively weak. Therefore, it is necessary to further use structured feature to represent the syntactic and semantic information of texts, and then calculate the text semantic similarity.

SUMMARY

The present disclosure provides a method and apparatus for calculating text semantic similarity and a computer-readable storage medium, and its main object is to improve the accuracy of text similarity calculation.

In order to achieve the above-mentioned object, the present disclosure provides a method for calculating text semantic similarity, including:
  acquiring a text pair to be compared, and respectively extracting a text structural feature of each text in the text pair to be compared;
  performing feature scaling and feature standardization processing on the text structural feature of each text to obtain an optimized text structural feature of each text;
  acquiring a text plane feature of each text in the text pair to be compared, and combining the optimized text structural feature of each text with a corresponding text plane feature to obtain a structure-plane feature of each text; and
  utilizing a kernel function to learn the structure-plane feature of each text in a pre-set support vector regression model to obtain a text similarity of the text pair to be compared, and scoring the text similarity via a pre-set scoring system to obtain a text similarity score.

Optionally, the respectively extracting a text structural feature of each text in the text pair to be compared includes:
  extracting a first text and a second text in the text pair to be compared;
  performing word segmentation processing on the first text and the second text respectively to obtain a first text word segmentation set and a second text word segmentation set;
  calculating a distance between each of words in the first text word segmentation set and each of words in the second text word segmentation set utilizing a pre-set distance calculation method, and pairing the words in the first text word segmentation set and the second text word segmentation set according to the distance to obtain a word correspondence;
  respectively analyzing dependencies of the first text and the second text, and constructing a first dependency tree of the first text and a second dependency tree of the second text according to the dependencies; and
  obtaining the text structural feature of the first text and the text structural feature of the second text according to the first dependency tree and the second dependency tree and the word correspondence.

Optionally, the respectively analyzing dependencies of the first text and the second text, and constructing a first dependency tree of the first text and a second dependency tree of the second text according to the dependencies includes:
  performing grammatical analysis on the first text and the second text to mark parts of speech and phrase structures of the first text and the second text;
  constructing a dependency arc between the first text word segmentation sets of the first text and constructing a dependency arc between the second text word segmentation sets of the second text according to the parts of speech and phrase structures of the first text and the second text; and
  constructing the first dependency tree of the first text according to the dependency arc between the first text word segmentation sets, and constructing the second dependency tree of the second text according to the dependency arc between the second text word segmentation sets.

Optionally, the performing feature scaling and feature standardization processing on the text structural feature of each text includes:
  acquiring a pre-set standard feature range, and performing a minimum-maximum scaling on the text structural feature of each text until a scaled text structural feature is located in the standard feature range to obtain the optimized text structural feature of each text.

Optionally, the acquiring a text plane feature of each text in the text pair to be compared includes:
  respectively performing noise reduction and standardization processing on the first text and the second text in the text pair to be compared to obtain a first standard text and a second standard text; and
  segmenting the first standard text to obtain a first text character string, and segmenting the second standard text to obtain a second text character string, and extracting plane features of the first text character string and the second text character string to obtain text plane features of the first text and the second text.

Optionally, the combining the optimized text structural feature of each text with a corresponding text plane feature to obtain a structure-plane feature of each text includes:

acquiring a pre-set multi-layer perceptron, and splicing the optimized text structural feature of each text and the corresponding text plane feature at an input layer of the multi-layer perceptron to obtain two input vectors; and performing non-linear transformation and feature synthesis on the two input vectors via a hidden layer of the multi-layer perceptron to obtain the structure-plane feature of each text.

Optionally, the utilizing a kernel function to learn the structure-plane feature of each text in a pre-set support vector regression model to obtain a text similarity of the text pair to be compared includes:

calculating a Euclidean distance between the structure-plane features of two texts, and calculating a kernel function value between the structure-plane features of the two texts;

calculating a similarity of the two structure-plane features according to the Euclidean distance between the structure-plane features of the two texts and the kernel function value; and based on the similarity between the structure-plane features, performing regression prediction utilizing the support vector regression model to obtain the text similarity of the text pair to be compared.

In order to solve the above-mentioned problem, the present disclosure provides an apparatus for calculating text semantic similarity, including:

a structural feature extraction module for performing feature scaling and feature standardization processing on the text structural feature of each text to obtain an optimized text structural feature of each text;

a structural feature optimization module for performing feature scaling and feature standardization processing on the text structural feature of each text to obtain an optimized text structural feature of each text;

a feature combination module for acquiring a text plane feature of each text in the text pair to be compared and combining the optimized text structural feature of each text with a corresponding text plane feature to obtain a structure-plane feature of each text; and a similarity calculation module for utilizing a kernel function to learn the structure-plane feature of each text in a pre-set support vector regression model to obtain a text similarity of the text pair to be compared and scoring the text similarity via a pre-set scoring system to obtain a text similarity score.

In order to solve the above-mentioned problem, the present disclosure provides an electronic device, the electronic device including:

at least one processor; and a memory in communication connection to the at least one processor, wherein the memory stores a computer program executable by the at least one processor, the computer program being executed by the at least one processor to enable the at least one processor to perform the method for calculating text semantic similarity described above.

In order to solve the above-mentioned problems, the present disclosure also provides a computer-readable storage medium having stored therein at least one computer program to be executed by a processor in the electronic device to implement the method for calculating text semantic similarity described above.

In the embodiment of the present disclosure, after the text pair to be compared is acquired, the text structural feature and the text plane feature of each text are respectively extracted, and after the text structural feature is optimized to obtain the optimized text structural feature, the text plane feature and the optimized text structural feature are combined to obtain the structure-plane feature to represent the text pair to be compared, so as to calculate the text pair to be compared from the advantages of the two types of features, and finally the text similarity between the text pair to be compared is obtained by calculating the two structure plane features using the kernel function and the support vector regression model. The present disclosure calculates the similarity of text pair to be compared by combining the two types of features, and performs quantization by means of scoring so as to improve the accuracy of text similarity calculation.

BRIEF DESCRIPTION OF THE ACCOMPANYING DRAWINGS

The realization of objects, functional features and advantages of the present disclosure will be further described with reference to the accompanying drawings in conjunction with the embodiments.

DETAILED DESCRIPTION OF ILLUSTRATED EMBODIMENTS

It should be understood that the particular embodiments described herein are illustrative only and are not restrictive.

An embodiment of the present application provides a method for calculating text semantic similarity. The performing subject of the method for calculating text semantic similarity includes, but is not limited to, at least one of a server end, a terminal end or other electronic device which can be configured to perform the method provided by the embodiment of the present application. In other words, the method for calculating text semantic similarity may be performed by software or hardware installed on a terminal device or a service-end device, and the software may be a block chain platform. The service end includes but is not limited to: a single server, a server cluster, a cloud-end server or a cloud-end server cluster, etc. The server can be an independent server, and can also be a cloud server providing basic cloud computing services, such as a cloud service, a cloud database, cloud computing, a cloud function, cloud storage, a network service, cloud communication, a middleware service, a domain name service, a security service, a content delivery network (CDN), and a big data and artificial intelligence platform.

Figure 1:
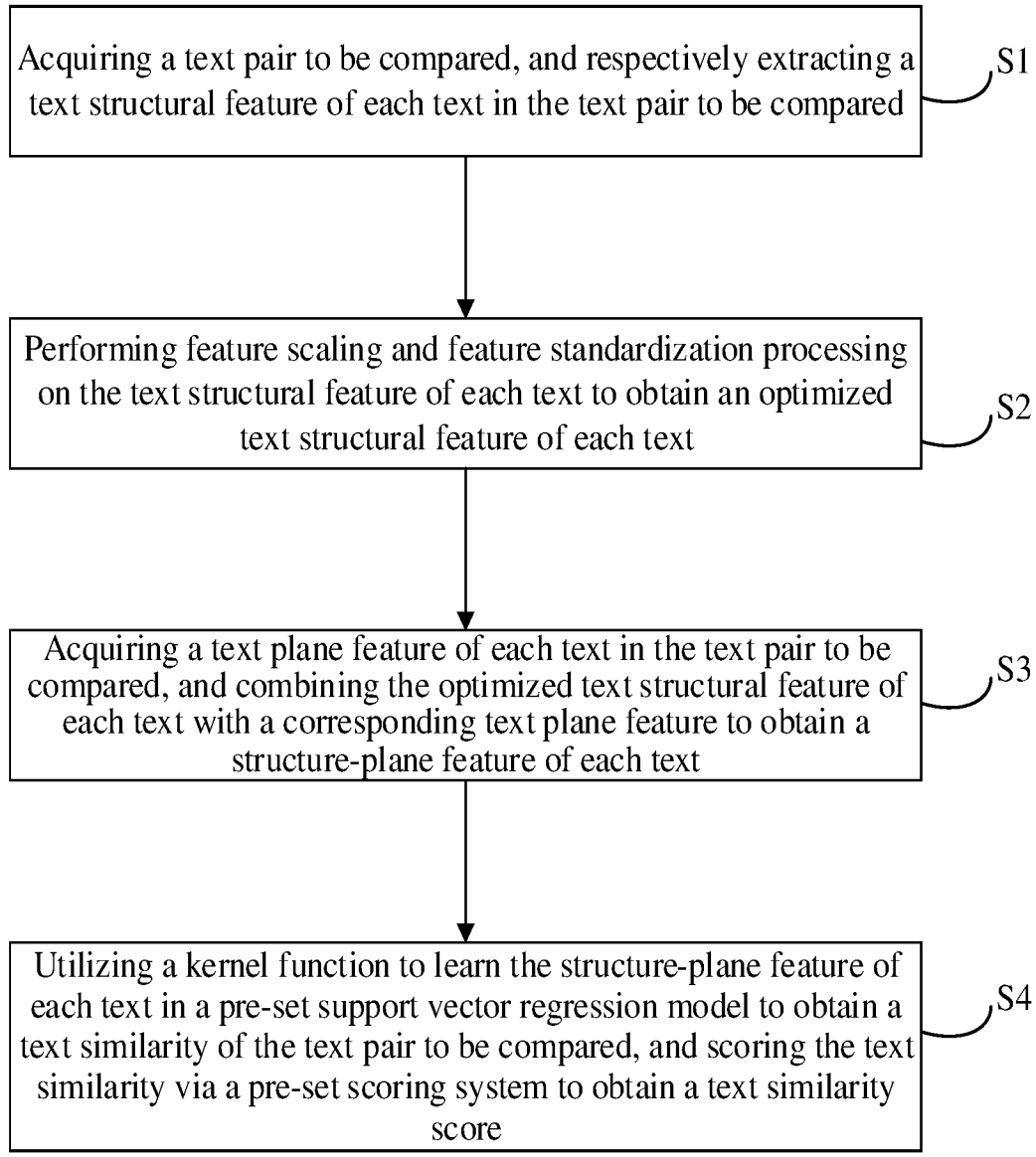
FIG. 1 is a schematic flow diagram of a method for calculating text semantic similarity provided by an embodiment of the present disclosure.

Reference is made to FIG. 1, which is a schematic flow diagram of a method for calculating text semantic similarity provided by an embodiment of the present disclosure.

In the present embodiment, the method for calculating text semantic similarity includes that:

S1, a text pair to be compared is acquired, and a text structural feature of each text in the text pair to be compared is respectively extracted.

In an embodiment of the present disclosure, the text pair to be compared is a text pair which needs calculation of text semantic similarity, and the text pair to be compared includes a first text and a second text. For example, the first text is "the weather is good today", and the second text is "the sky is beautiful today".

In the embodiment of the present disclosure, the text structural feature is mainly a feature representing the text structure, such as a syntactic structural feature of the text. For example, although the two texts of "tiger attacking lion" and "lion attacking tiger" have identical vocabularies, the syntactic structures are different, and when a subject-object relationship is considered, the subjects and the objects are completely opposite between the two texts.

The subject represents an executor of an action and has an initiative, and the object is an acceptor of the action and has a passive. For example, in the text "tiger attacking lion", the tiger is the subject and the lion is the object.

Figure 2:
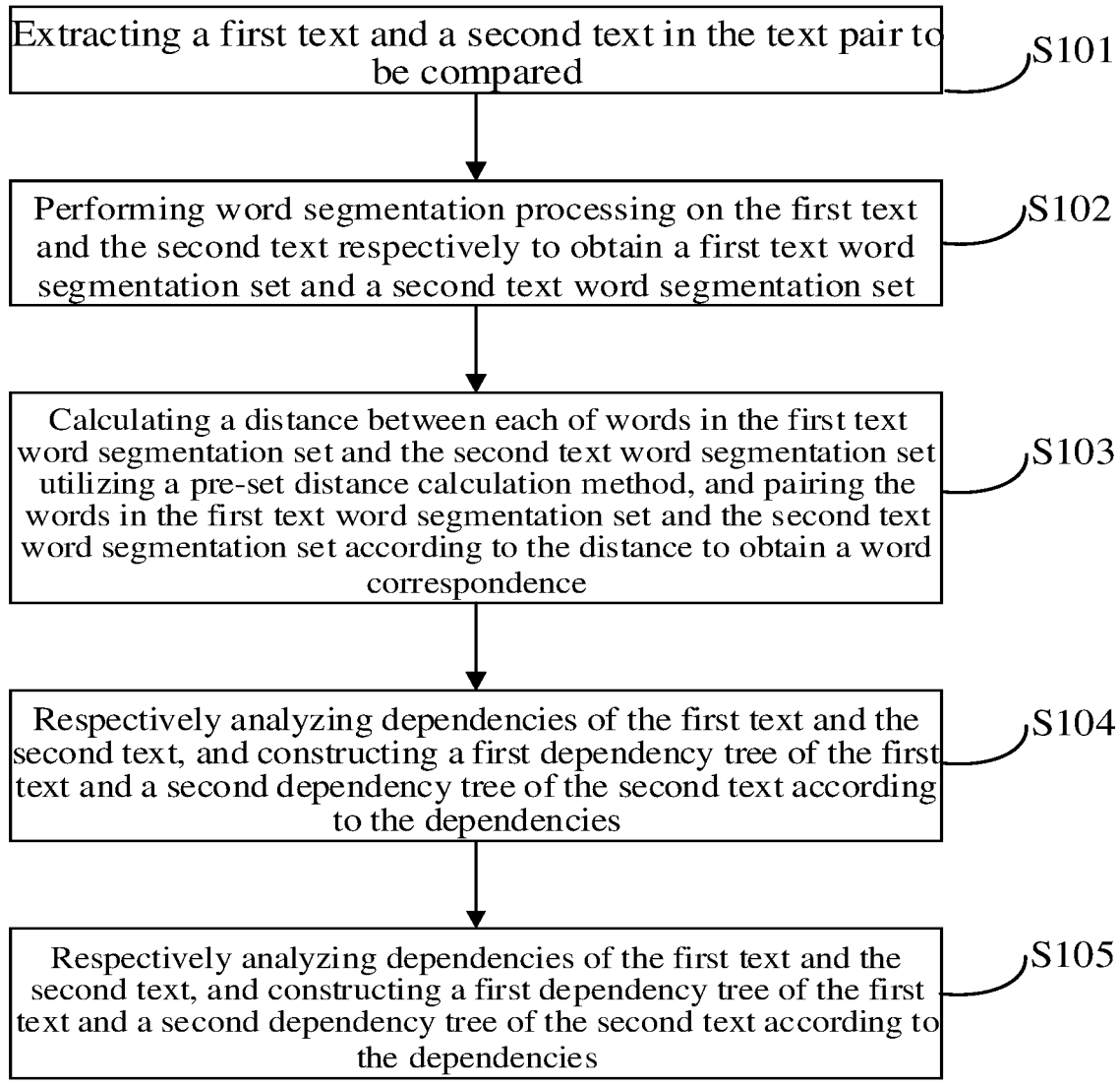
FIG. 2 is a detailed implementation schematic flow diagram of one of the steps in the method for calculating text semantic similarity shown in FIG. 1.

With reference to FIG. 2, furthermore, the respectively extracting a text structural feature of each text in the text pair to be compared includes:

S101, extracting a first text and a second text in the text pair to be compared;

S102, performing word segmentation processing on the first text and the second text respectively to obtain a first text word segmentation set and a second text word segmentation set;

S103, calculating a distance between each of words in the first text word segmentation set and each of words in the second text word segmentation set utilizing a pre-set distance calculation method, and pairing the words in the first text word segmentation set and the second text word segmentation set according to the distance to obtain a word correspondence;

S104, respectively analyzing dependencies of the first text and the second text, and constructing a first dependency tree of the first text and a second dependency tree of the second text according to the dependencies; and S105, obtaining the text structural feature of the first text and the text structural feature of the second text according to the first dependency tree and the second dependency tree and the word correspondence.

In an embodiment of the present disclosure, a Euclidean distance calculation formula may be used to calculate a distance between each of the words in the first text word segmentation set and the second text word segmentation set.

In an embodiment of the present disclosure, the dependency refers to a grammatical association of a group of words with each other in a sentence, and such a relation can be represented as a tree structure, and such a tree structure is the dependency tree. There is only one parent node for each word in a given text, and the dependency tree may be constructed accordingly.

In detail, in natural language processing, the characterization of a text is often related to the content and context of the text, representing the information and meaning carried by the text on the semantic level. In representing the similarity of a pair of texts with plane features, the characterization is relatively weak, so it is necessary to further use structured features to represent the similarity relationship of texts.

Furthermore, the respectively analyzing dependencies of the first text and the second text, and constructing a first dependency tree of the first text and a second dependency tree of the second text according to the dependencies includes:

performing grammatical analysis on the first text and the second text to mark parts of speech and phrase structures of the first text and the second text;

constructing a dependency arc between the first text word segmentation sets of the first text and constructing a dependency arc between the second text word segmentation sets of the second text according to the parts of speech and phrase structures of the first text and the second text; and constructing the first dependency tree of the first text according to the dependency arc between the first text word segmentation sets, and constructing the second dependency tree of the second text according to the dependency arc between the second text word segmentation sets.

In an embodiment of the present disclosure, the dependency arc represents a directed arc of a specific syntactic relationship between two words, and the dependency arc is directed from a dependent word to a dominant word. For example, in "a worker needs to calculate text similarity", "needs" is a dependent word, "a worker" is a dominant word of "needs", "calculate" is a dependent word, and "text similarity" is a dominant word of "calculate".

In an embodiment of the present disclosure, before the respectively extracting a text structural feature of each text in the text pair to be compared, the method further includes:

performing symbol screening on each text in the text pair to be compared respectively, removing redundant symbol(s) in the text pair to be compared, and obtaining a cleaned text pair;

removing stop words in the cleaned text pair via a pre-set text screening method, and unifying text languages in the cleaned text pair to obtain a cleaned text pair to be compared.

The embodiment of the present disclosure may avoid the occurrence of unrecognized symbols in the text when the text is subsequently processed by performing symbol screening on the text, and may avoid the need to invoke multiple language processing methods when the text pair is processed by unifying the text languages in the cleaned text pair.

S2, feature scaling and feature standardization processing are performed on the text structural feature of each text to obtain an optimized text structural feature of each text.

In the embodiment of the present disclosure, the accuracy and effect of applying features to tasks such as text classification and emotion analysis can be improved by performing feature scaling and feature standardization processing on the text structural features.

In detail, the performing feature scaling and feature standardization processing on the text structural feature of each text includes:

acquiring a pre-set standard feature range, and performing a minimum-maximum scaling on the text structural feature of each text until a scaled text structural feature is located in the standard feature range to obtain the optimized text structural feature of each text.

In an embodiment of the present disclosure, the standard feature range is a value range of a specific feature, and performing feature standardization on the text structural feature of the text is a process of making the text structural feature fall within the value range.

Further, the present disclosure performs feature scaling by converting the text structural feature of the text into a vector form, wherein the text structural feature of the text is scaled into a pre-set standard feature range to facilitate combination and operation of features.

S3, a text plane feature of each text in the text pair to be compared is acquired, and the optimized text structural feature of each text is combined with a corresponding text plane feature to obtain a structure-plane feature of each text.

In an embodiment of the disclosure, the text plane feature refers to a visual two-dimensional representation of the text, e.g. a character string feature, a text extension feature, etc.

Figure 3:
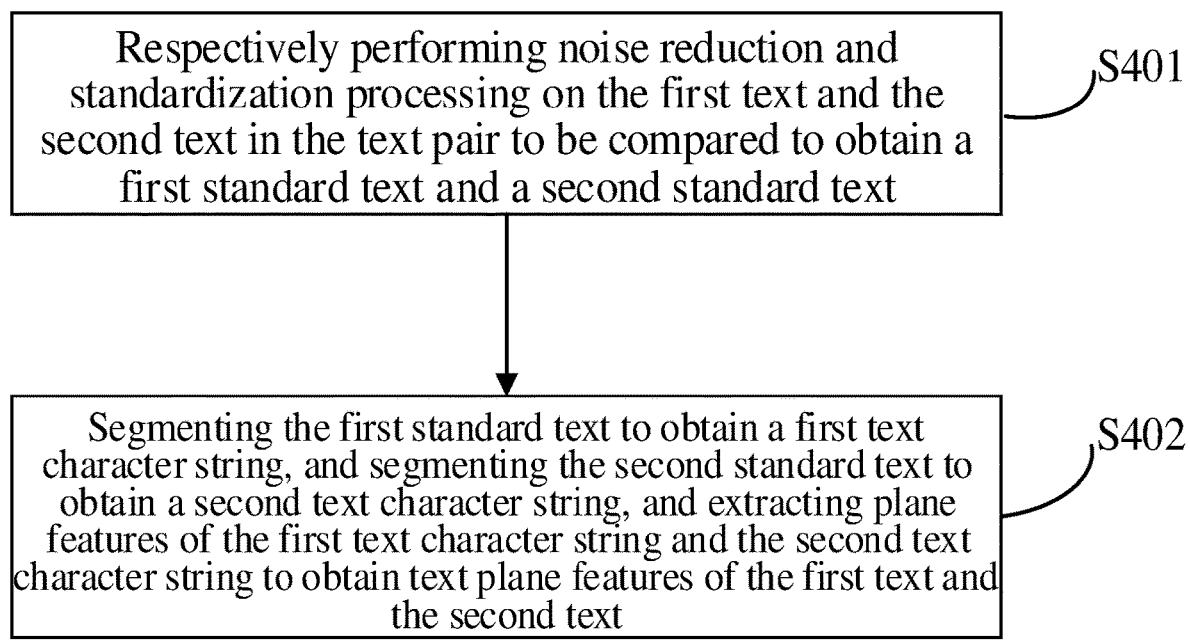
FIG. 3 is a detailed implementation schematic flow diagram of one of the steps in the method for calculating text semantic similarity shown in FIG. 1.

With reference to FIG. 3, in an embodiment of the present disclosure, the acquiring a text plane feature of each text in the text pair to be compared includes:

S301, respectively performing noise reduction and standardization processing on the first text and the second text in the text pair to be compared to obtain a first standard text and a second standard text; and S302, segmenting the first standard text to obtain a first text character string, and segmenting the second standard text to obtain a second text character string, and extracting plane features of the first text character string and the second text character string to obtain text plane features of the first text and the second text.

In detail, the standardization is to unify language formats of the text to be compared, removing stop words, etc.

In the embodiment of the present disclosure, the first and second standard texts may be segmented using regular expression matching to obtain the first and second text character strings.

In an embodiment of the present disclosure, the text plane feature includes a character string feature and a text extension feature, and therefore, an embodiment of the present disclosure respectively extracts the character string feature and the text extension feature of the text character string, and combines the character string feature and the text extension feature of the text character string to obtain the text plane feature of each text. In detail, the embodiment of the present disclosure can obtain the character string feature by extracting word frequency, and part of speech in the text character string, and obtain the text extension feature by extracting text length, text type, and sentence complexity in the text character string.

Further, in the embodiment of the present disclosure, the optimized text structural feature of the text and the corresponding text plane feature may be directly combined to form a combined feature as the structure-plane feature. For example, when $t_i$ represents the text plane feature, and $v_i$ represents the optimized text structural feature, $\langle t_i, v_i \rangle$ may be used directly as the structure-plane feature of the text pair to be compared.

In another embodiment of the present disclosure, the combining the optimized text structural feature of each text with a corresponding text plane feature to obtain a structure-plane feature of each text includes:

acquiring a pre-set multi-layer perceptron, and splicing the optimized text structural feature of each text and the corresponding text plane feature at an input layer of the multi-layer perceptron to obtain two input vectors; and performing non-linear transformation and feature synthesis on the two input vectors via a hidden layer of the multi-layer perceptron to obtain the structure-plane feature of each text.

The multi-layer perceptron (MLP) is a basic model in artificial neural network, which is usually configured to solve problems of classification and regression. Compared with traditional perception model, the multi-layer perceptron model is added with one or more hidden layers, which contain a plurality of neurons, and can fuse the features, so that the features have stronger characterization ability.

In an embodiment of the present disclosure, before the splicing the optimized text structural feature of each text and the corresponding text plane feature at an input layer of the multi-layer perceptron to obtain two input vectors, and after the performing non-linear transformation and feature synthesis on the two input vectors via a hidden layer of the multi-layer perceptron, the step of converting the feature and the vector into each other may also be comprised, wherein since the feature is a text feature, the feature and the vector may be converted into each other by means of digital encoding.

S4, a kernel function is utilized to learn the structure-plane feature of each text in a pre-set support vector regression model to obtain a text similarity of the text pair to be compared, and the text similarity is acquired via a pre-set scoring system to obtain a text similarity score.

In the embodiment of the present disclosure, the support vector regression (SVR) model is a non-parametric regression model based on a support vector machine (SVM), and is configured to calculate the text similarity of the text pair to be compared in the present scheme.

The kernel function is a kind of common function in machine learning, and is generally configured for mapping the data of original space into a high-dimensional space, and is configured to expand the ability of the linear model in the support vector machine and improve a task performance of classification and regression, such as calculating the text similarity.

In an embodiment of the disclosure, the scoring system may return a similarity calculation score for a given pair of texts. For example, the score ranges from 0 to 10, with 0 indicating that the meanings of the pair of texts are completely irrelevant and 10 indicating that the meanings of the pair of texts are exactly the same.

In addition, the performance of the same score can also be evaluated by the Pearson correlation coefficient of the similarity score and a manual evaluation score obtained through systematic calculation, wherein the Pearson correlation coefficient is configured to measure the correlation between two variables X and Y, and the value thereof lies between −1 and 1; when the Pearson correlation coefficient is close to −1, it represents negative correlation; and when the Pearson correlation coefficient is close to 0, it represents no correlation.

Furthermore, the utilizing a kernel function to learn the structure-plane feature of each text in a pre-set support vector regression model to obtain a text similarity of the text pair to be compared includes:

calculating a Euclidean distance between the structure-plane features of two texts, and calculating a kernel function value between the structure-plane features of the two texts;

calculating a similarity of the two structure-plane features according to the Euclidean distance between the structure-plane features of the two texts and the kernel function value; and based on the similarity between the structure-plane features, performing regression prediction utilizing the support vector regression model to obtain the text similarity of the text pair to be compared.

Further, the kernel function formula for calculating the kernel function value between the structure-plane features of the two texts is provided as follows:

$$K(x_i, x_j) = K_{TK}(t_i, t_j) + K_{fvec}(v_i, v_j)$$

wherein $K_{TK}$ is a numerical kernel function for calculating the structural feature, $K_{fvec}$ is a kernel function for calculating the plane feature, $t_i$ and $v_i$ constitute a structure-plane feature, $t_j$ and $v_j$ constitute a structure-plane feature, and $K(x_i, x_j)$ is the kernel function value.

In an embodiment of the present disclosure, the calculation formula for calculating the similarity of the two structure-plane features according to the Euclidean distance between the structure-plane features of the two texts and the kernel function value is provided as follows:

$$S_{ij} = K(x_i, x_j) \times \exp(-\gamma d_{ij})$$

wherein $\gamma$ is a hyperparameter that controls a relationship between the Euclidean distance and the kernel function value, $K(x_i, x_j)$ is the kernel function value between the structure-plane feature $x_i$ and the structure-plane feature $x_j$, $S_{ij}$ is the similarity between two structure-plane features, and $d_{ij}$ is the Euclidean distance between two structure-plane features.

In the embodiment of the present disclosure, after the text pair to be compared is acquired, the text structural feature and the text plane feature of each text are respectively extracted, and after the text structural feature is optimized to obtain the optimized text structural feature, the text plane feature and the optimized text structural feature are combined to obtain the structure-plane feature to represent the text pair to be compared, so as to calculate the text pair to be compared from the advantages of the two types of features, and finally the text similarity between the text pair to be compared is obtained by calculating the two structure plane features using the kernel function and the support vector regression model. The present disclosure calculates the similarity of text pair to be compared by combining the two types of features, and performs quantization by means of scoring so as to improve the accuracy of text similarity calculation.

Figure 4:
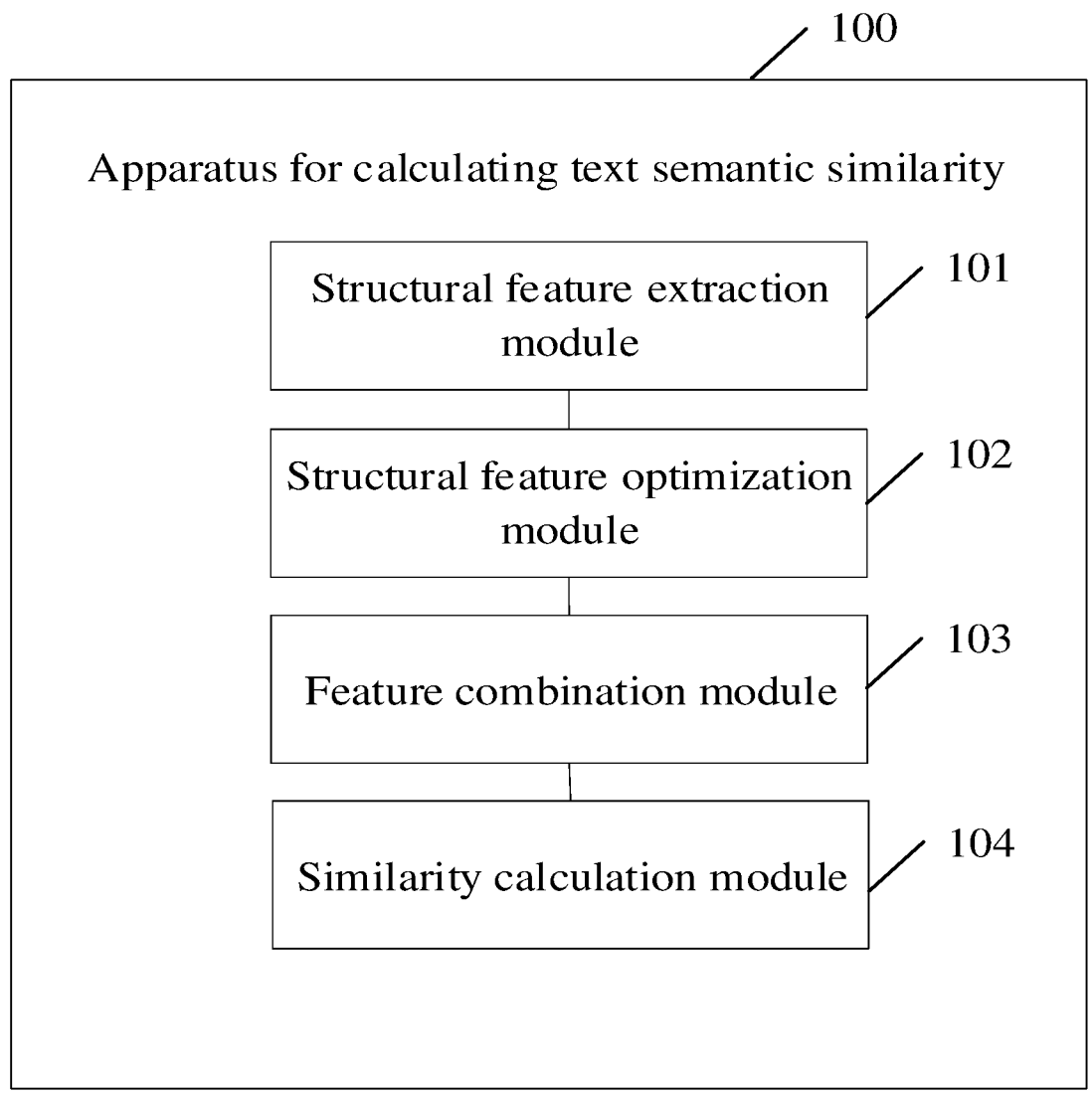
FIG. 4 is a functional module diagram of an apparatus for calculating text semantic similarity provided by an embodiment of the present disclosure.

FIG. 4 shows a functional module diagram of an apparatus for calculating text semantic similarity provided by an embodiment of the present disclosure.

The apparatus for calculating text semantic similarity 100 according to the present disclosure may be mounted in an electronic device. According to the implemented functions, the apparatus for calculating text semantic similarity 100 may include a structural feature extraction module 101, a structural feature optimization module 102, a feature combination module 103 and a text similarity calculation module 104. A module of the present disclosure, which may also be referred to as a unit, refers to a series of computer program segments capable of being executed by the processor of the electronic device and capable of performing fixed functions, which are stored in the memory of the electronic device.

In the present embodiment, the functions of each module/unit are provided as follows that:

the structural feature extraction module 101 is configured for performing feature scaling and feature standardization processing on the text structural feature of each text to obtain an optimized text structural feature of each text;

the structural feature optimization module 102 is configured for performing feature scaling and feature standardization processing on the text structural feature of each text to obtain an optimized text structural feature of each text;

the feature combination module 103 is configured for acquiring a text plane feature of each text in the text pair to be compared and combining the optimized text structural feature of each text with a corresponding text plane feature to obtain a structure-plane feature of each text; and the similarity calculation module 104 is configured for utilizing a kernel function to learn the structure-plane feature of each text in a pre-set support vector regression model to obtain a text similarity of the text pair to be compared and scoring the text similarity via a pre-set scoring system to obtain a text similarity score.

In detail, the various modules described in the apparatus for calculating text semantic similarity 100 in the embodiment of the present disclosure adopts the same technical means as the method for calculating text semantic similarity described in the above-mentioned FIGS. 1 to 3 and can produce the same technical effect, and will not be described in detail here.

Figure 5:
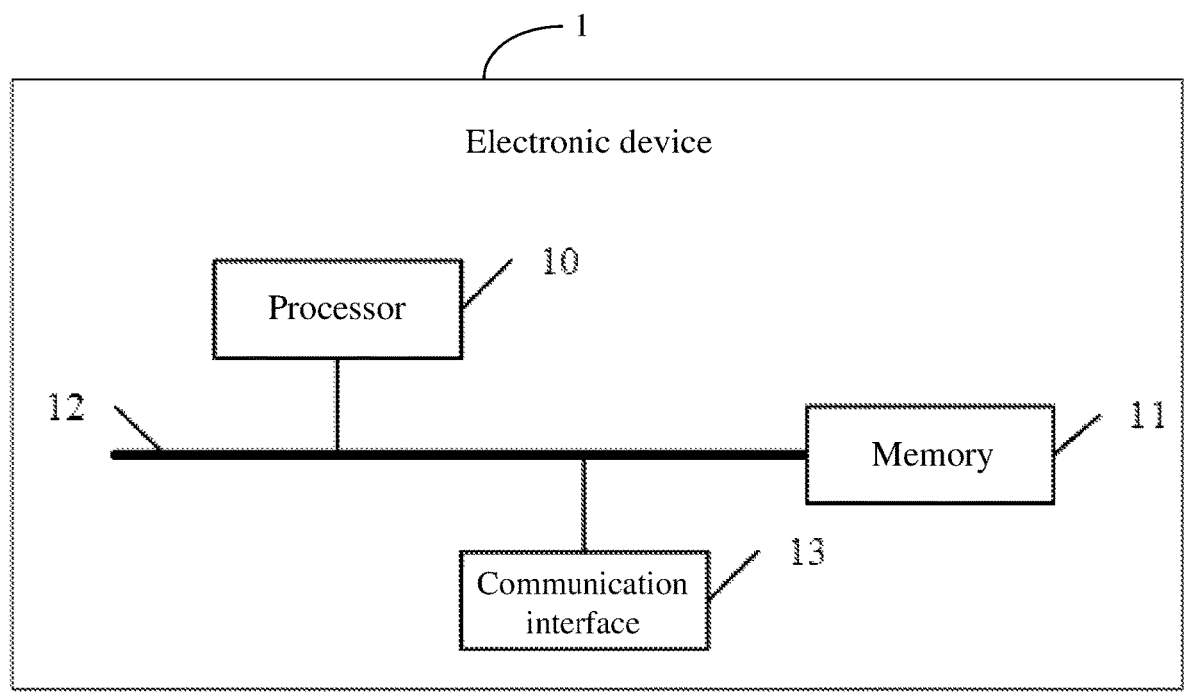
FIG. 5 is a schematic structural diagram of an electronic device implementing the method for calculating text semantic similarity provided by an embodiment of the present disclosure.

FIG. 5 shows a schematic structural diagram of an electronic device implementing the method for calculating text semantic similarity provided by an embodiment of the present disclosure.

The electronic device 1 may include a processor 10, a memory 11, a communication bus 12 and a communication interface 13, and may further include a computer program, such as a program for calculating text semantic similarity, stored in the memory 11 and executable on the processor 10.

The processor 10 may, in some embodiments, be comprised of an integrated circuit, such as a single packaged integrated circuit, or a plurality of integrated circuits packaged with the same or different functions, including one or more central processing units (CPU), microprocessors, digital processing chips, graphics processors, combinations of various control chips, and the like. The processor 10 is a control unit of the electronic device, connects various components of the entire electronic device using various interfaces and lines, and performs various functions of the electronic device and processes data by running or executing the programs or modules stored in the memory 11 (for example, executing the program for calculating text semantic similarity, etc.), and calls data stored in the memory 11.

The memory 11 includes at least one type of readable storage medium, and the readable storage medium includes a flash memory, a mobile hard disk, a multimedia card, a card-type memory (for example: SD or DX memory, etc.), a magnetic memory, a magnetic disk, an optical disk, etc. The memory 11 may in some embodiments be an internal storage unit of the electronic device, such as a mobile hard disk of the electronic device. The memory 11 may in other embodiments also be an external storage device of the electronic device, such as a plug-in mobile hard disk, a smart media card (SMC), a secure digital (SD) card, a flash card, etc. provided on the electronic device. Further, the memory 11 may include both the internal storage unit and the external storage device of the electronic device. The memory 11 may be configured not only for storing an application software installed in the electronic device and various types of data, such as codes of the program for calculating text semantic similarity, but also for temporarily storing data that has been output or is to be output.

The communication bus 12 may be a peripheral component interconnect (PCI) bus or an extended industry standard architecture (EISA) bus or the like. The bus may be divided into an address bus, a data bus, a control bus, etc. The bus is provided to enable connection communication between the memory 11 and the at least one processor 10 etc.

The communication interface 13 is configured for communication between the electronic device and other devices, including a network interface and a user interface. Alternatively, the network interface may include a wired interface and/or a wireless interface (e.g. a WI-FI interface, a Bluetooth interface, etc.), typically for establishing the communication connection between the electronic device and other electronic devices. The user interface may be a display, an input unit (such as a keyboard), optionally a standard wired interface, a wireless interface. Alternatively, in some embodiments, the display may be an LED display, a liquid crystal display, a touch-sensitive liquid crystal display, an OLED (organic light-emitting diode) touchpad, or the like. Where appropriate, the display may also be referred to as a display screen or a display unit for displaying information processed in the electronic device and for displaying a visualized user interface.

FIG. 5 only shows the electronic device with components, while it is understood by a person skilled in the art that the structure shown in FIG. 5 does not constitute a limitation to the electronic device 1 and may include fewer or more components than shown, or some components in combination, or a different arrangement of components.

For example, although not shown, the electronic device may also include a power source (e.g. a battery) for powering the various components. Preferably, the power source may be logically connected to the at least one processor 10 via power source management means so that functions of charging management, discharging management, and power consumption management are realized via the power source management means. The power source may also include one or more of a direct current or alternating current power source, a recharging device, a power source failure detection circuit, a power source converter or an inverter, a power source status indicator, and any other component. The electronic device may further include various sensors, bluetooth modules, Wi-Fi modules, etc. which will not be described in detail herein.

It should be understood that the embodiments are for illustrative purposes only and are not to be construed as limiting the scope of the patent application into this structure.

The program for calculating text semantic similarity stored in the memory 11 in the electronic device 1 is a combination of a plurality of instructions, and, when running in the processor 10, can implement the steps of:
acquiring a text pair to be compared, and respectively extracting a text structural feature of each text in the text pair to be compared;
performing feature scaling and feature standardization processing on the text structural feature of each text to obtain an optimized text structural feature of each text;
acquiring a text plane feature of each text in the text pair to be compared, and combining the optimized text structural feature of each text with a corresponding text plane feature to obtain a structure-plane feature of each text; and
utilizing a kernel function to learn the structure-plane feature of each text in a pre-set support vector regression model to obtain a text similarity of the text pair to be compared, and scoring the text similarity via a pre-set scoring system to obtain a text similarity score.

In particular, for the specific implementation method of the above-described instruction by the processor 10, reference can be made to the description of the relevant steps in the corresponding embodiments of the accompanying drawings, which will not be repeated here.

Further, the integrated modules/units of the electronic device 1, if implemented in the form of software functional units and sold or used as stand-alone products, may be stored in a computer-readable storage medium. The computer-readable storage medium can be volatile or non-volatile. For example, the computer-readable medium may include: any entity or device, recording medium, U disk, mobile hard disk, magnetic disk, optical disk, computer memory, read-only memory (ROM), capable of carrying the computer program codes.

The present disclosure also provides a computer-readable storage medium having stored thereon a computer program, wherein the computer program, when executed by a processor of an electronic device, implements the steps of:
acquiring a text pair to be compared, and respectively extracting a text structural feature of each text in the text pair to be compared;
performing feature scaling and feature standardization processing on the text structural feature of each text to obtain an optimized text structural feature of each text;
acquiring a text plane feature of each text in the text pair to be compared, and combining the optimized text structural feature of each text with a corresponding text plane feature to obtain a structure-plane feature of each text; and
utilizing a kernel function to learn the structure-plane feature of each text in a pre-set support vector regression model to obtain a text similarity of the text pair to be compared, and scoring the text similarity via a pre-set scoring system to obtain a text similarity score.

In several embodiments provided by the present disclosure, it should be understood that the disclosed device, apparatus and method may be implemented in other ways. For example, the apparatus embodiments described above are merely illustrative. For example, the partitioning of the modules is merely a logical function partitioning, and additional partitioning manner may be adopted in practical implementations.

The modules illustrated as separate components may or may not be physically separated, and the components shown as modules may or may not be physical units, namely, may be located in one place, or may also be distributed over a plurality of network elements. Some or all of the modules therein may be selected to achieve the object of the solution of the present embodiment according to actual needs.

In addition, various functional modules in various embodiments of the present disclosure may be integrated in one processing unit, or various units may be physically separately provided, or two or more units may be integrated in one unit. The above-mentioned integrated units can be implemented in the form of hardware or in the form of hardware plus software functional module.

It will be evident to those skilled in the art that the present disclosure is not limited to the details of the foregoing illustrative embodiments, and that the present disclosure may be embodied in other specific forms without departing from the spirit or essential characteristics thereof.

The embodiments are therefore to be considered in all respects as illustrative and not restrictive, the scope of the disclosure being indicated by the appended claims rather than by the foregoing description, and all changes which come within the meaning and range of equivalency of the claims are therefore intended to be embraced by the present disclosure. Any reference signs in the claims shall not be construed as limiting the claim concerned.

The block chain referred to in the present disclosure is a new application mode of distributed data storage, point-to-point transmission, authentication mechanism, encryption algorithm and other computer technologies. A block chain, essentially a decentralized database, is a string of data blocks generated in association using cryptographic methods, each data block containing information about a batch of network transactions for verifying the validity of the information (anti-counterfeiting) and generating the next block. A block chain may include a block chain underlying platform, a platform product service layer, and an application service layer, etc.

Embodiments of the present application may obtain and process relevant data based on artificial intelligence techniques. Among them, artificial intelligence (AI) is a theory, method, technology and application system that uses a digital computer or digital computer-controlled machine to simulate, extend and expand human intelligence, perceive the environment, acquire knowledge and use the knowledge to obtain the best results.

Furthermore, it will be understood that the word "comprise" does not exclude other elements or steps and the singular does not exclude the plural. A plurality of the units or apparatuses recited in the system claims may also be embodied by one unit or apparatus via software or hardware. The terms first, second, etc. are used to refer to names and do not denote any particular order.

Finally, it should be noted that the above-mentioned embodiments are merely illustrative of the technical solution of the present disclosure, and are not restrictive. Although the present disclosure has been described in detail with reference to the foregoing preferred embodiments, those skilled in the art will appreciate that the technical solutions of the present disclosure can be amended or replaced with equivalents without departing from the spirit and scope of the technical solutions of the present disclosure.

What is claimed is:

1. A method for calculating text semantic similarity, wherein the method is based on a computer program stored and executed in an electronic device; in response to content input by a user into a search system or a response system of the electronic device, the method matches a text with a highest similarity to the content, thereby enabling the search system or the response system to perform subsequent operations; the computer program, when executed by a processor of the electronic device, controls the electronic device to perform the following steps of the method:

acquiring a text pair to be compared, and respectively extracting a text structural feature of each text in the text pair to be compared, wherein the text structural feature represents a text structure of the text;

converting the text structural feature of each text into a vector, performing feature scaling and feature standardization processing on the vector to obtain an optimized text structural feature of each text;

acquiring a text plane feature of each text in the text pair to be compared, and combining the optimized text structural feature of each text with a corresponding text plane feature to obtain a structure-plane feature of the each text, wherein the text plane feature refers to a visual two-dimensional representation of the text; and utilizing a kernel function to learn the structure-plane feature of each text in a pre-set support vector regression model to obtain a text similarity of the text pair to be compared, and scoring the text similarity via a pre-set scoring system to obtain a text similarity score which is used in the search system or the response system;

the combining the optimized text structural feature of each text with a corresponding text plane feature to obtain a structure-plane feature of each text comprises:

acquiring a pre-set multi-layer perceptron, and splicing the optimized text structural feature of each text and the corresponding text plane feature at an input layer of the multi-layer perceptron to obtain two input vectors; and performing non-linear transformation and feature synthesis on the two input vectors via a hidden layer of the multi-layer perceptron to obtain the structure-plane feature of each text.

2. The method for calculating text semantic similarity according to claim 1, wherein the respectively extracting a text structural feature of each text in the text pair to be compared comprises:

extracting a first text and a second text in the text pair to be compared;

performing word segmentation processing on the first text and the second text respectively to obtain a first text word segmentation set and a second text word segmentation set;

calculating a distance between each of words in the first text word segmentation set and each of words in the second text word segmentation set utilizing a pre-set distance calculation method, and pairing the words in the first text word segmentation set and the second text word segmentation set according to the distance to obtain a word correspondence;

respectively analyzing dependencies of the first text and the second text, and constructing a first dependency tree of the first text and a second dependency tree of the second text according to the dependencies; and obtaining the text structural feature of the first text and the text structural feature of the second text according to the first dependency tree and the second dependency tree and the word correspondence.

3. The method for calculating text semantic similarity according to claim 2, wherein the respectively analyzing dependencies of the first text and the second text, and constructing a first dependency tree of the first text and a second dependency tree of the second text according to the dependencies comprises:

performing grammatical analysis on the first text and the second text to mark parts of speech and phrase structures of the first text and the second text;

constructing a dependency arc between the first text word segmentation sets of the first text and constructing a dependency arc between the second text word segmentation sets of the second text according to the parts of speech and phrase structures of the first text and the second text; and constructing the first dependency tree of the first text according to the dependency arc between the first text word segmentation sets, and constructing the second dependency tree of the second text according to the dependency arc between the second text word segmentation sets.

4. The method for calculating text semantic similarity according to claim 1, wherein the performing feature scaling and feature standardization processing on the text structural feature of each text comprises:
    acquiring a pre-set standard feature range, and performing a minimum-maximum scaling on the text structural feature of each text until a scaled text structural feature is located in the standard feature range to obtain the optimized text structural feature of each text.

5. The method for calculating text semantic similarity according to claim 1, wherein the acquiring a text plane feature of each text in the text pair to be compared comprises:
    respectively performing noise reduction and standardization processing on the first text and the second text in the text pair to be compared to obtain a first standard text and a second standard text; and
    segmenting the first standard text to obtain a first text character string, and segmenting the second standard text to obtain a second text character string, and extracting plane features of the first text character string and the second text character string to obtain text plane features of the first text and the second text.

6. The method for calculating text semantic similarity according to claim 1, wherein the utilizing a kernel function to learn the structure-plane feature of each text in a pre-set support vector regression model to obtain a text similarity of the text pair to be compared comprises:
    calculating a Euclidean distance between the structure-plane features of two texts, and calculating a kernel function value between the structure-plane features of the two texts;
    calculating a similarity of the two structure-plane features according to the Euclidean distance between the structure-plane features of the two texts and the kernel function value; and
    based on the similarity between the structure-plane features, performing regression prediction utilizing the support vector regression model to obtain the text similarity of the text pair to be compared.

7. An electronic device, the electronic device comprising:
    at least one processor; and
    a memory in communication connection to the at least one processor, wherein
    the memory stores a computer program executable by the at least one processor, the computer program being executed by the at least one processor to enable the at least one processor to perform the following steps, which are capable of, in response to content input by a user into a search system or a response system of the electronic device, matching a text with a highest similarity to the content, thereby enabling the search system or the response system to perform subsequent operations:
    acquiring a text pair to be compared, and respectively extracting a text structural feature of each text in the text pair to be compared, wherein the text structural feature represents a text structure of the text;
    converting the text structural feature of each text into a vector, performing feature scaling and feature standardization processing on the vector to obtain an optimized text structural feature of the each text;
    acquiring a text plane feature of each text in the text pair to be compared, and combining the optimized text structural feature of each text with a corresponding text plane feature to obtain a structure-plane feature of the each text, wherein the text plane feature refers to a visual two-dimensional representation of the text; and
    utilizing a kernel function to learn the structure-plane feature of each text in a pre-set support vector regression model to obtain a text similarity of the text pair to be compared, and scoring the text similarity via a pre-set scoring system to obtain a text similarity score which is used in the search system or the response system;
    the combining the optimized text structural feature of each text with a corresponding text plane feature to obtain a structure-plane feature of each text comprises:
    acquiring a pre-set multi-layer perceptron, and splicing the optimized text structural feature of each text and the corresponding text plane feature at an input layer of the multi-layer perceptron to obtain two input vectors; and
    performing non-linear transformation and feature synthesis on the two input vectors via a hidden layer of the multi-layer perceptron to obtain the structure-plane feature of each text.

8. The electronic device according to claim 7, wherein the respectively extracting a text structural feature of each text in the text pair to be compared comprises:
    extracting a first text and a second text in the text pair to be compared;
    performing word segmentation processing on the first text and the second text respectively to obtain a first text word segmentation set and a second text word segmentation set;
    calculating a distance between each of words in the first text word segmentation set and each of words in the second text word segmentation set utilizing a pre-set distance calculation method, and pairing the words in the first text word segmentation set and the second text word segmentation set according to the distance to obtain a word correspondence;
    respectively analyzing dependencies of the first text and the second text, and constructing a first dependency tree of the first text and a second dependency tree of the second text according to the dependencies; and
    obtaining the text structural feature of the first text and the text structural feature of the second text according to the first dependency tree and the second dependency tree and the word correspondence.

9. The electronic device according to claim 8, wherein the respectively analyzing dependencies of the first text and the second text, and constructing a first dependency tree of the first text and a second dependency tree of the second text according to the dependencies comprises:
    performing grammatical analysis on the first text and the second text to mark parts of speech and phrase structures of the first text and the second text;
    constructing a dependency arc between the first text word segmentation sets of the first text and constructing a dependency arc between the second text word segmentation sets of the second text according to the parts of speech and phrase structures of the first text and the second text; and
    constructing the first dependency tree of the first text according to the dependency arc between the first text word segmentation sets, and constructing the second dependency tree of the second text according to the dependency arc between the second text word segmentation sets.

10. The electronic device according to claim 7, wherein the performing feature scaling and feature standardization processing on the text structural feature of each text comprises:

acquiring a pre-set standard feature range, and performing a minimum-maximum scaling on the text structural feature of each text until a scaled text structural feature is located in the standard feature range to obtain the optimized text structural feature of each text.

11. The electronic device according to claim 7, wherein the acquiring a text plane feature of each text in the text pair to be compared comprises:

respectively performing noise reduction and standardization processing on the first text and the second text in the text pair to be compared to obtain a first standard text and a second standard text; and segmenting the first standard text to obtain a first text character string, and segmenting the second standard text to obtain a second text character string, and extracting plane features of the first text character string and the second text character string to obtain text plane features of the first text and the second text.

12. The electronic device according to claim 7, wherein the utilizing a kernel function to learn the structure-plane feature of each text in a pre-set support vector regression model to obtain a text similarity of the text pair to be compared comprises:

calculating a Euclidean distance between the structure-plane features of two texts, and calculating a kernel function value between the structure-plane features of the two texts;

calculating a similarity of the two structure-plane features according to the Euclidean distance between the structure-plane features of the two texts and the kernel function value; and based on the similarity between the structure-plane features, performing regression prediction utilizing the support vector regression model to obtain the text similarity of the text pair to be compared.

13. A non-volatile computer-readable storage medium having stored thereon a computer program, wherein the computer program, when executed by a processor of an electronic device, implements the following steps, which are capable of, in response to content input by a user into a search system or a response system of the electronic device, matching a text with a highest similarity to the content, thereby enabling the search system or the response system to perform subsequent operations:

acquiring a text pair to be compared, and respectively extracting a text structural feature of each text in the text pair to be compared, wherein the text structural feature represents a text structure of the text;

converting the text structural feature of each text into a vector, performing feature scaling and feature standardization processing on the vector to obtain an optimized text structural feature of each text;

acquiring a text plane feature of each text in the text pair to be compared, and combining the optimized text structural feature of each text with a corresponding text plane feature to obtain a structure-plane feature of each text, wherein the text plane feature refers to a visual two-dimensional representation of the text; and utilizing a kernel function to learn the structure-plane feature of each text in a pre-set support vector regression model to obtain a text similarity of the text pair to be compared, and scoring the text similarity via a pre-set scoring system to obtain a text similarity score which is used in the search system or the response system;

the combining the optimized text structural feature of each text with a corresponding text plane feature to obtain a structure-plane feature of each text comprises:

acquiring a pre-set multi-layer perceptron, and splicing the optimized text structural feature of each text and the corresponding text plane feature at an input layer of the multi-layer perceptron to obtain two input vectors; and performing non-linear transformation and feature synthesis on the two input vectors via a hidden layer of the multi-layer perceptron to obtain the structure-plane feature of each text.

14. The non-volatile computer-readable storage medium according to claim 13, wherein the respectively extracting a text structural feature of each text in the text pair to be compared comprises:

extracting a first text and a second text in the text pair to be compared;

performing word segmentation processing on the first text and the second text respectively to obtain a first text word segmentation set and a second text word segmentation set;

calculating a distance between each of words in the first text word segmentation set and each of words in the second text word segmentation set utilizing a pre-set distance calculation method, and pairing the words in the first text word segmentation set and the second text word segmentation set according to the distance to obtain a word correspondence;

respectively analyzing dependencies of the first text and the second text, and constructing a first dependency tree of the first text and a second dependency tree of the second text according to the dependencies; and obtaining the text structural feature of the first text and the text structural feature of the second text according to the first dependency tree and the second dependency tree and the word correspondence.

15. The non-volatile computer-readable storage medium according to claim 14, wherein the respectively analyzing dependencies of the first text and the second text, and constructing a first dependency tree of the first text and a second dependency tree of the second text according to the dependencies comprises:

performing grammatical analysis on the first text and the second text to mark parts of speech and phrase structures of the first text and the second text;

constructing a dependency arc between the first text word segmentation sets of the first text and constructing a dependency arc between the second text word segmentation sets of the second text according to the parts of speech and phrase structures of the first text and the second text; and constructing the first dependency tree of the first text according to the dependency arc between the first text word segmentation sets, and constructing the second dependency tree of the second text according to the dependency arc between the second text word segmentation sets.

16. The non-volatile computer-readable storage medium according to claim 13, wherein the acquiring a text plane feature of each text in the text pair to be compared comprises:

respectively performing noise reduction and standardization processing on the first text and the second text in the text pair to be compared to obtain a first standard text and a second standard text; and segmenting the first standard text to obtain a first text character string, and segmenting the second standard text to obtain a second text character string, and extracting plane features of the first text character string and the second text character string to obtain text plane features of the first text and the second text.

17. The non-volatile computer-readable storage medium according to claim 13, wherein the utilizing a kernel function to learn the structure-plane feature of each text in a pre-set support vector regression model to obtain a text similarity of the text pair to be compared comprises:

calculating a Euclidean distance between the structure-plane features of two texts, and calculating a kernel function value between the structure-plane features of the two texts;

calculating a similarity of the two structure-plane features according to the Euclidean distance between the structure-plane features of the two texts and the kernel function value; and based on the similarity between the structure-plane features, performing regression prediction utilizing the support vector regression model to obtain the text similarity of the text pair to be compared.

* * * * *